Feb. 19, 1929.　　　　　W. B. BRONANDER　　　　　1,702,627
TRANSMISSION MECHANISM
Filed June 16, 1925　　　5 Sheets-Sheet 1

INVENTOR
Wilhelm B. Bronander
BY
Marshall & Hawley
ATTORNEYS

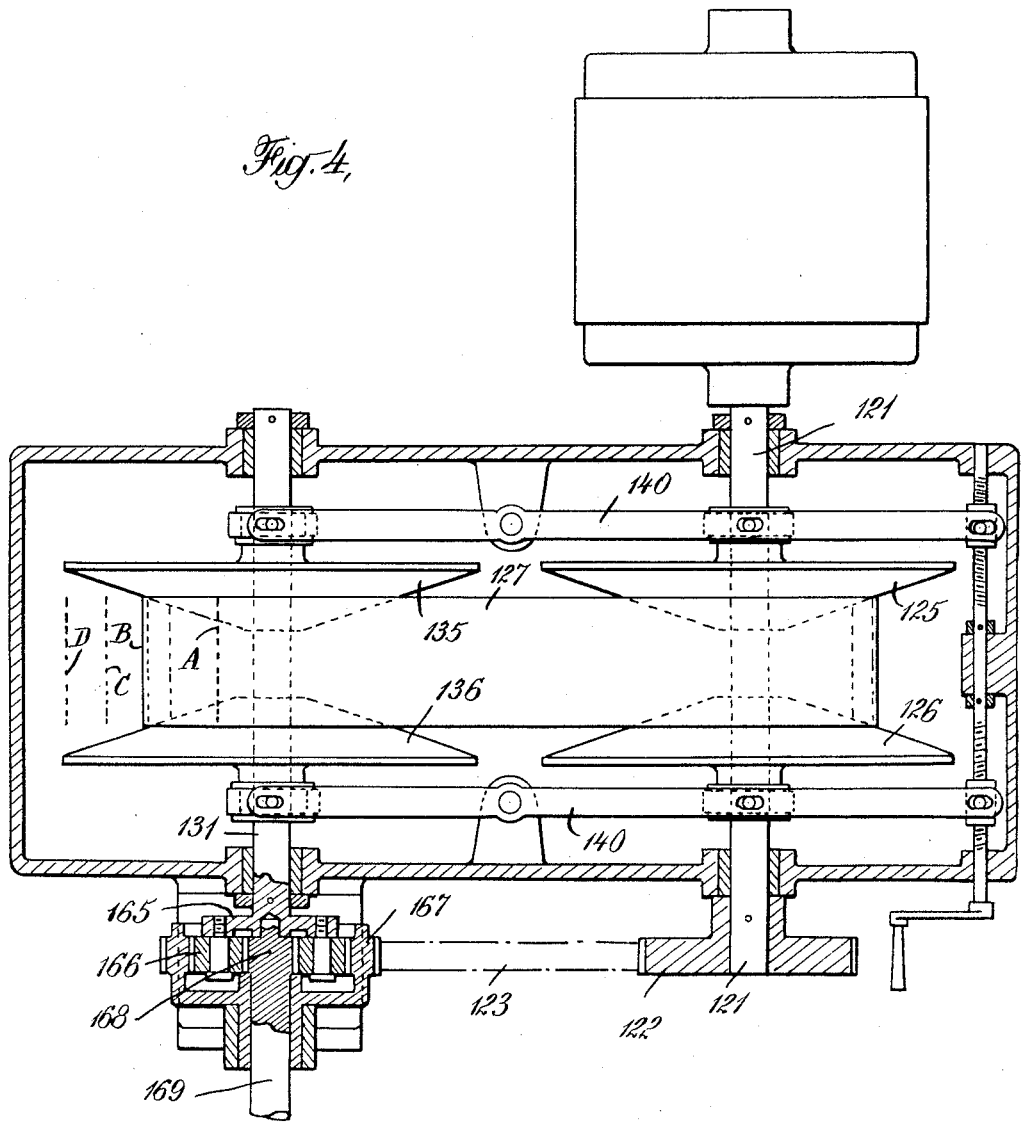

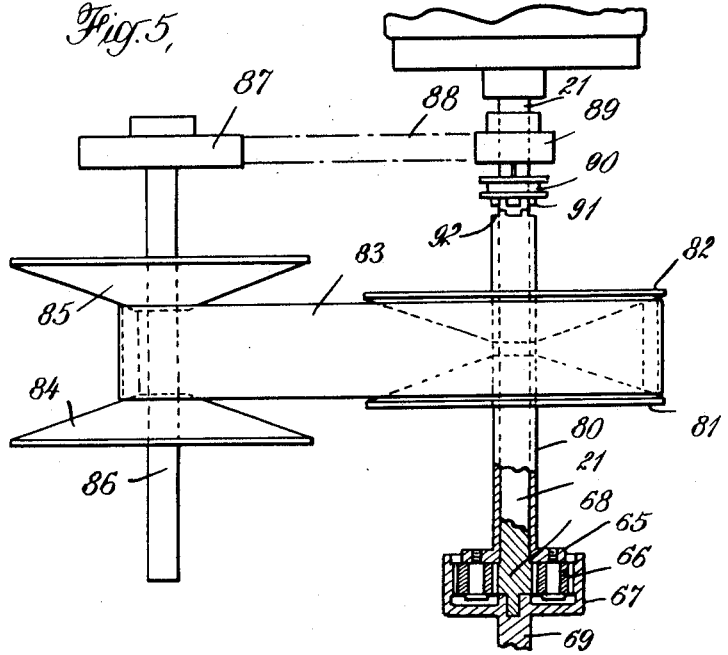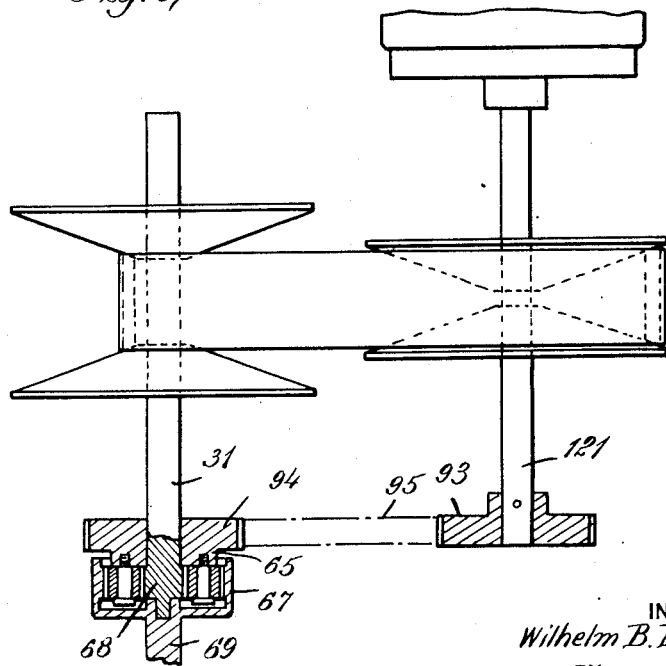

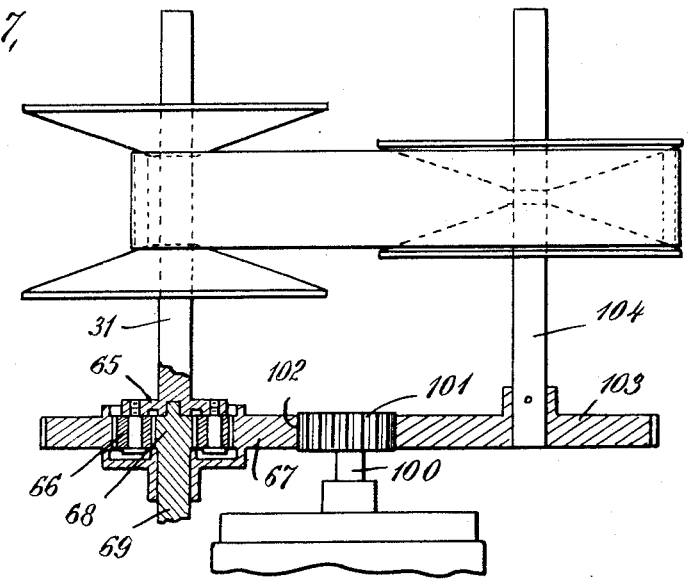
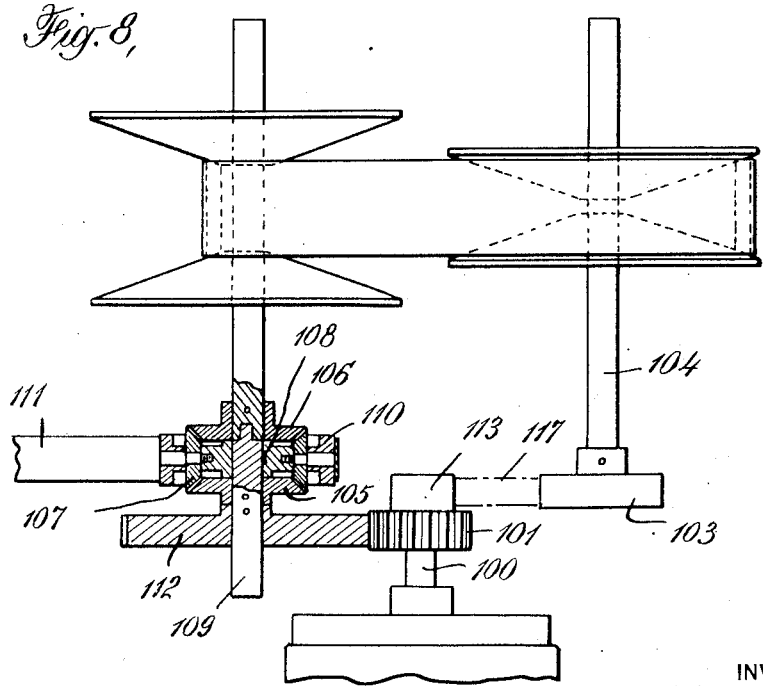

Feb. 19, 1929.  1,702,627
W. B. BRONANDER
TRANSMISSION MECHANISM
Filed June 16, 1925  5 Sheets-Sheet 5

INVENTOR
Wilhelm B. Bronander
BY
Marshall & Hawley
ATTORNEYS

Patented Feb. 19, 1929.

1,702,627

UNITED STATES PATENT OFFICE.

WILHELM B. BRONANDER, OF MONTCLAIR, NEW JERSEY.

TRANSMISSION MECHANISM.

Application filed June 16, 1925. Serial No. 37,438.

This invention relates to variable speed transmission gearing.

As is well known, practically all of the change speed mechanisms heretofore devised provide for a limited number of speed changes and in changing from one speed to another, speed and driving effort are lost. Moreover, with most of such devices the change must be effected with considerable care and requires considerable skill since certain gears are thrown out of mesh and other gears are thrown into mesh.

This invention has for its salient object to provide mechanism or gearing by means of which any speed from zero to maximum can be readily and easily obtained by the manipulation of simple control means requiring no skill or care for its operation.

Another object of the invention is to provide variable speed mechanism or gearing by means of which an infinite variety of speeds ranging from zero to maximum can be obtained at the will of the operator and without loss of driving effort or speed during the transitional period.

Another object of the invention is to provide speed transforming mechanism so constructed and arranged that the product of the torque times the speed is always constant or, in other words, as the speed increases, the torque correspondingly decreases and vice versa.

Further objects of the invention will appear from the following specification taken in connection with the drawings, which form a part of this application, and in which Fig. 1 is a sectional elevation showing one form of transmission constructed in accordance with the invention;

Fig. 4 is a view similar to Fig. 1, but showing a slightly different embodiment of the invention;

Fig. 5 is a schematic elevational view showing another form of transmission constructed in accordance with the invention;

Fig. 6 is a view similar to Fig. 5, but illustrating still another embodiment of the invention;

Figs. 7, 8 and 9 are views similar to Fig. 5, but illustrating further embodiments of the invention.

The invention briefly described consists of transmission mechanism comprising differential or planetary gearing in which two of the elements of the planetary gearing are driven, one element being driven at a relatively constant speed and the other being driven at a variable speed. The drive is taken from the third element of the gearing. For instance, in the form of the invention shown in Fig. 1, the spider having the planet gears thereon is driven at motor speed, the ring gear is driven at a variable speed and the driven shaft is connected to the pinion. In Fig. 4 the ring gear is driven at motor speed, the spider is driven at a variable speed and again the pinion is connected to the driven shaft.

It will be understood that what is meant by "constant" or "relatively constant" speed is the speed at which the drive shaft is driven and this driving speed may be varied as for instance when an internal combustion engine is connected to the drive shaft.

The variable speed driving connection is so constructed and arranged that in one position of adjustment thereof, the driven shaft will remain stationary although the drive shaft is rotating. In another position of adjustment, the driven shaft will be driven at the same speed as the drive shaft, or, in other words, a direct drive will be obtained. In other positions of adjustment, the driven shaft can be driven at a speed greater than the drive shaft, in the same direction as the drive shaft or at a speed less than the drive shaft and in the same direction, or in still other positions of adjustment, the driven shaft will be rotated in a direction opposite to the direction of rotation of the drive shaft.

Further details of the invention will appear from the following description.

Figure 1:
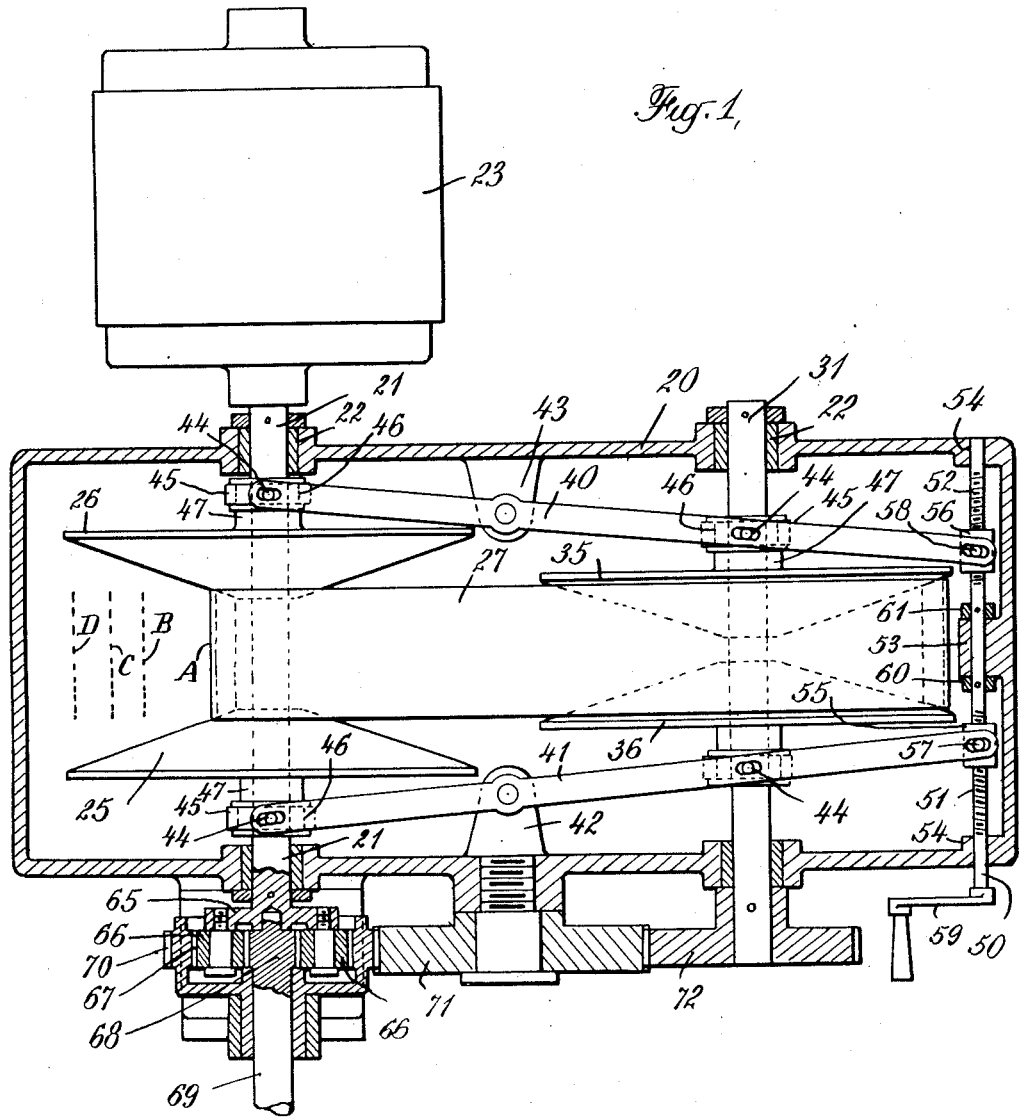
Figure 2:
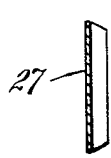
Fig. 2 is a transverse sectional elevation of the belt shown in Fig. 1.
Figure 3:
Fig. 3 is an elevational view of the belt shown in Fig. 1.

*Description of structure shown in Fig. 1.*

In this form of the invention there is illustrated a rectangular frame 20 having a pair of shafts 21 and 31 mounted in bearings 22.

The shaft 21 is driven by a motor 23 and has slidably splined thereon a pair of conical disks 25 and 26 and the shaft 31 has slidably splined thereon a pair of conical disks 35 and 36. A belt 27 is mounted between the disks 25 and 26 and between the disks 35 and 36.

Any suitable means may be provided for shifting the disks laterally. In this form of the invention this is accomplished by means of levers 40 and 41 pivoted on lugs 42 and 43 disposed at opposite sides of the frame 20. The levers 40 and 41 at one end have a pin and slot connection 44 with yokes 45 which in turn are positioned in grooves 46 formed in hubs 47 of the disks 25 and 26.

The levers 40 and 41 on the opposite sides of their pivots have similar pin and slot connections 44 with yokes 45 mounted on hubs 47 of the disks 35 and 36. The levers are pivotally adjusted on their pivots by means of a threaded rod 50 having right hand and left hand threads 51 and 52, the rod being mounted in bearings 53 and 54. Sleeves 55 and 56 are mounted on the threads 51 and 52 and are connected by pin and slot connections 57 and 58 to the ends of the levers 40 and 41. A crank handle 59 is secured to the free end of the rod 50 for facilitating the rotation thereof and collars 60 and 61 are mounted on the rod adjacent the ends of the central bearing 53 for preventing endwise movement of the rod as it is rotated.

As the rod 50 is rotated in one direction, the disks 25 and 26 will be moved apart and the disks 35 and 36 will be simultaneously moved toward each other. When the rod is rotated in the opposite direction, the reverse takes place.

As shown in Fig. 1, when the disks 25 and 26 are located apart from each other, the belt 27 will be disposed adjacent the centers of the disks and will be disposed adjacent the peripheries of the disks 35 and 36.

In the embodiment of the invention shown in Fig. 1, planetary gearing is mounted on the frame with its center of rotation in alinement with the axis of the shaft 21. This gearing comprises a spider 65 having planet gears 66 mounted thereon, a ring gear 67 meshing with the planet gears and a pinion 68 disposed centrally in the planetary gearing and meshing with the planet gears. The driven shaft 69 is connected to the pinion 68 and the shaft 21 is connected to the spider 65.

The ring gear 67 has internal teeth meshing with the planet gears 66 and external teeth 70 meshing with an idler 71 driven by a gear 72 mounted on the shaft 31. Since the shaft 31 is driven at a variable speed by means of the disks and the belt, the ring gear will also be driven at a variable speed. Four positions of adjustment of the belt are illustrated, these four positions being indicated as A, B, C and D, but it will be understood that there are many other positions between the two extreme positions A and D in which the belt may be adjusted.

*Operation of structure shown in Fig. 1.*

With the belt adjusted to the position B, the driven shaft 69 will be driven at the same speed and in the same direction as the drive shaft 21 since both sets of disks will be rotated at the same speed. When the belt is adjusted to positions between B and A, the driven shaft will be rotated in the same direction as the drive shaft but at a higher speed, the maximum speed of the driven shaft being obtained at the position A. When the belt is adjusted from position B to position C, the driven shaft is slowed down and at the position C, ceases to rotate although the drive shaft continues to rotate. In the positions between C and D, the driven shaft will be rotated in the reverse direction or in a direction opposite to the drive shaft, the maximum reverse speed being obtained at D.

From the foregoing description of the operation it will be seen that when the ring gear is driven at the same speed as the spider, a direct drive will be obtained and all the parts will rotate as a unit. As the ring gear is slowed down or driven at a slower speed than the speed of the drive shaft, the pinion and driven shaft will be speeded up to give an overdirect drive or to rotate the driven shaft at a speed greater than the drive shaft. Conversely, as the ring gear is driven at a speed greater than the speed of the drive shaft, the driven shaft will cease from rotating or if the difference in speed be great enough, the driven shaft will be rotated in a direction opposite the direction of rotation of the drive.

*Description of structure shown in Fig. 4.*

In the structure shown in Fig. 4, the planetary gearing elements are so connected to the drive shaft that the ring gear will be driven at a relatively constant or drive shaft speed, the speed of rotation of the spider will be varied and the driven shaft is connected to the pinion.

In this embodiment of the invention, the motor shaft 121 has slidably splined thereon conical disks 125 and 126 which are connected by a belt 127 to drive conical disks 135 and 136. Levers 140 and 141 are connected to the disks and are adjusted in the same manner as in the embodiment shown in Fig. 1. In this instance, however, the motor shaft 121 is connected by a gear 122 and a chain 123 to drive the ring gear 167 of the planetary gearing, the shaft 131 which is driven by the cone disks 135 and 136 is connected to the spider 165 of the planetary gearing and the pinion 168 of the planetary gearing is connected to the driven shaft 169. Thus in this form of the invention, the speed of rotation of the spider 165 and the planet gears 166 carried thereby is varied by means of the adjustment of the cone disks and belt.

In this form of the invention, as in the other, four positions of the belt A, B, C and D are shown.

*Operation of structure shown in Fig. 4.*

As stated at the outset of the description of the structure shown in Fig. 4, in this structure the ring gear is driven at a relatively constant speed, the spider is driven at a variable speed and the pinion is connected to the driven shaft. Therefore, in order to obtain the different variations in speed and direction of rotation of the driven shaft, the speed of rotation of the spider is varied from maximum to minimum. When the spider is rotated at maximum speed, an overdirect drive will be obtained, when the spider is rotated at the same speed as the ring gear, a direct drive will be obtained and when the spider is rotated at its minimum speed, the driven shaft will be rotated in a direction opposite the direction of rotation of the drive shaft and at its maximum reverse speed.

Four positions of adjustment of the belt have been indicated in Fig. 4, namely, A, B, C and D and these four positions indicate respectively maximum overdirect drive, direct drive, no drive, and maximum reverse drive. As explained in connection with the other embodiment of the invention, the driven shaft will be speeded up from the position B to the position A, will be slowed down to zero from position B to position C and will be speeded up in the reverse direction from position C to position D.

*Description of structure shown in Fig. 5.*

The showing in Fig. 5 is somewhat schematic and the details of the mounting and of the adjustment of the disks have been omitted. In this form of the invention, the pinion 68 is connected to the motor shaft 21 and the ring gear 67 is connected to the driven shaft 69. The spider 65 having planet gears 66 thereon is connected to a sleeve 80 on which are splined conical disks 81 and 82. The disks 81 and 82 are driven through a belt 83 by disks 84 and 85 splined to a shaft 86. The shaft 86 is connected by a gear 87 and chain 88 to a gear 89 connected to the motor shaft 21. By means of the foregoing connections, it will be seen that the spider 65 will be driven at a variable speed obtained by adjusting the disks 81, 82, 84 and 85.

A clutch collar 90 is splined to the shaft 21 and is provided with teeth 91 adapted to co-act with teeth 92 formed on one end of the sleeve 80 so that the sleeve 80 can be driven at direct or motor speed by moving the clutch elements into coacting position with each other. This shift should not be made until the speed of rotation of the spider has been brought to approximately the speed of rotation of the drive shaft.

*Operation of structure shown in Fig. 5.*

When the belt 83 is positioned at the peripheries or substantially at the peripheries of the diks 81 and 82, the driven shaft will be rotated in a direction opposite the direction of rotation of the drive shaft. As the belt is adjusted inwardly toward the axis of the disks 81 and 82, the driven shaft in the successive positions of the belt will be stopped from rotating, driven at increasing speeds in the same direction as the drive shaft until the driven shaft is driven at the same speed as the drive shaft and as the belt is moved still further toward the axis of the disks 81 and 82, the driven shaft will be driven at increasingly greater speeds and in the same direction of rotation as the drive shaft.

*Description of structure shown in Fig. 6.*

Fig. 6 illustrates schematically another form of the invention. This structure is similar to that shown in Fig. 5 but differs therefrom in that the spider is driven at constant or motor speed, the pinion is driven at variable speed and the driven shaft is connected to the ring gear. The motor shaft 121 is connected by gears or sprockets 93 and 94 and a chain 95 to the spider 65. The ring gear 67 is connected to the driven shaft 69 and the pinion 68 is connected to the shaft 31 which is driven at a variable speed through the conical disks and by the drive in the manner hereinbefore illustrated.

*Operation of structure shown in Fig. 6.*

In this structure as hereinbefore set forth, the spider is driven at constant speed, the pinion at a variable speed and the ring gear is connected to the driven shaft. When the belt is positioned at the outer peripheries of the disks mounted on the motor or drive shaft, a reverse drive of the driven shaft will be obtained. As the belt is moved inwardly on these disks toward the axis thereof, no drive, direct drive and overdirect drive of the driven shaft will be successively obtained.

*Description of structure shown in Fig. 7.*

In this embodiment of the invention as in the embodiment shown in Fig. 4, the ring gear is driven at constant speed or motor speed, the spider is driven at a variable speed and the driven shaft is connected to the pinion.

In this form of the invention, however, the motor shaft 100 has a gear 101 mounted thereon which meshes with external teeth 102 formed on the ring gear 67 and the gear 101 also meshes with a gear 103 mounted on shaft 104. The shaft 104 is connected by the conical disks and belt in the manner hereinbefore described to shaft 31 which is connected to the spider 65. Planet gears 66 are carried by the spider and mesh with the ring gear 67 and also with the pinion 68 and the pinion 68 is connected to the driven shaft 69.

*Operation of structure shown in Fig. 7.*

As hereinbefore set forth, in the construction shown in Fig. 7 the ring gear is driven at constant speed, the spider at variable speed and the driven shaft is connected to the pinion. This statement is also true of the structure shown in Fig. 4. With the belt positioned as shown, an overdirect drive of the driven shaft will be obtained and as the belt is moved inwardly with reference to the disks shown at the right and outwardly with reference to the disks shown at the left in Fig. 7, direct drive, no drive and reverse drive will be obtained in the same manner as set forth in connection with the structure shown in Fig. 4.

*Description of structure shown in Fig. 8.*

In Fig. 8 a differential gearing is illustrated and comprises oppositely facing bevel gears 105 and 106 which mesh with radially mounted planet gears 107 rotatably mounted on a spider 108 which in turn is rotatably mounted on shaft 109 around which the differential gearing is disposed. The spider 108 is extended beyond the planet gears 107 in the form of a pulley 110 and a driven belt 111 is mounted on the pulley. The motor shaft 100 as in the embodiment of the invention shown in Fig. 7 is provided with a gear 101 and also with a sprocket gear 113 which is connected by a chain 117 to a sprocket gear 103 carried by the shaft 104. The shaft 104 is connected to the shaft 109 by the variable speed cone disk and belt drive connection.

The gear 101 meshes with a gear 112 which is connected to the bevel gear 105.

Thus it will be seen that the bevel gear 105 is driven at constant speed, the bevel gear 106 is driven at variable speed and the drive is taken by the belt 111 from the spider 108.

*Operation of structure shown in Fig. 8.*

With the structure shown in Fig. 8, when the belt is adjusted to a central position on the disks so that both sets of disks will be driven at the same speed, the spider 108 will remain stationary and no drive will be obtained. As the belt is adjusted toward the axis of the disks on the shaft 109, the gear 106 will be driven at a greater speed than the gear 105 and the spider 108 will be driven in the same direction as the direction of rotation of the drive shaft 100. As the belt is adjusted outwardly away from its intermediate position or toward the peripheries of the disks on the shaft 109, the bevel gear 106 will be driven at a reduced speed and the spider will be driven in a reverse direction at increasing speeds as the belt is moved outwardly.

Figure 9:
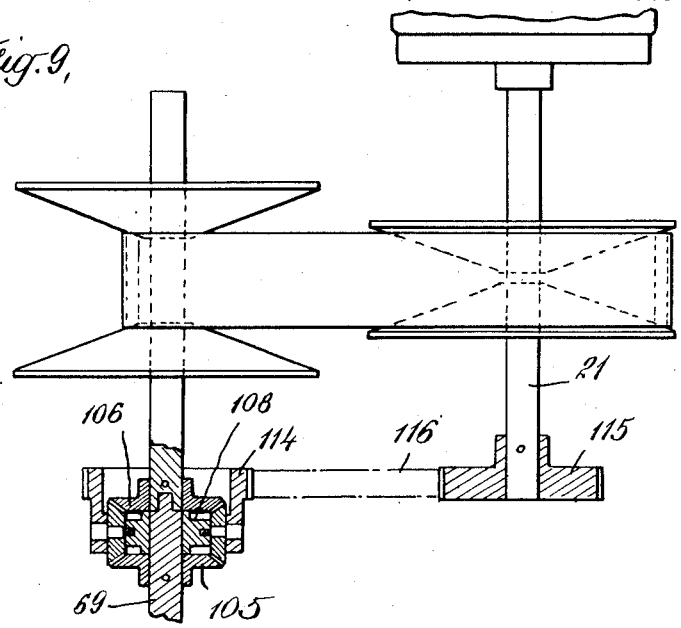

*Description of structure shown in Fig. 9.*

Fig. 9 also illustrates a differential gearing. In this form of the invention, however, the spider 108 is driven at constant speed by means of gears 114, 115 and a chain 116 from the motor driven shaft 21.

The bevel gear 106 is driven at variable speed by means of the cone and belt variable speed drive hereinbefore described.

The bevel gear 105 is connected to the driven shaft 69.

*Operation of structure shown in Fig. 9.*

When the belt is adjusted to the position shown in Fig. 9, the shaft 69 will be driven in a reverse direction at its maximum reverse speed. As the belt is moved outwardly on the disks shown at the left in Fig. 9, a driven shaft will successively pass through the stages of no drive, direct drive, and overdirect drive. In this case as hereinbefore set forth, the driven shaft 69 is connected to the bevel gear 105, the spider 108 is driven at a constant speed and the bevel gear 106 is driven at a variable speed. When the bevel gear 106 is driven at its maximum speed, the maximum reverse drive of the driven shaft will be obtained. As this bevel gear is slowed down, the driven shaft will be stopped, given a direct drive and an overdirect drive.

Figure 10:
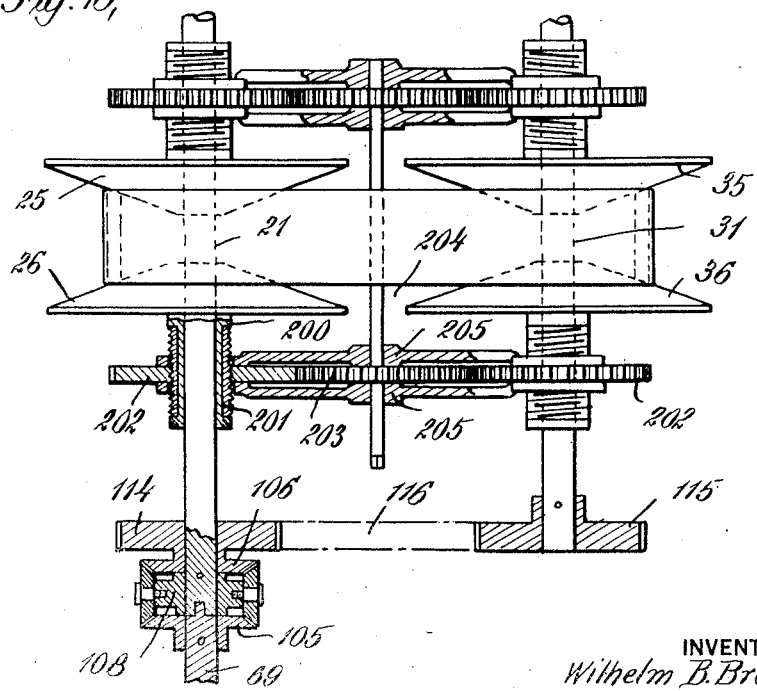
Fig. 10 is a sectional elevation showing different means from those illustrated in Fig. 1 for shifting the disks of the variable speed drive toward and away from each other and also showing another modification of the driving connections.

*Description of structure shown in Fig. 10.*

Fig. 10 illustrates other means for accomplishing the adjustment of the conical disks. In this figure, the disks 25 and 26 and 35 and 36 are carried by the shafts 21 and 31. Each of the disks has secured thereto, a hub 200 provided with an annular groove therein in which there is positioned a threaded sleeve 201. The sleeves carried by the hubs connected to the disks 25 and 36 are threaded in one direction and the sleeves connected to the hubs carried by the disks 35 and 26 are threaded in the opposite direction. Each sleeve has mounted thereon a gear 202 having internal threads meshing with the threads on the sleeve and having external teeth thereon meshing with the teeth of a gear 203 mounted on a shaft 204. The shaft 204 is mounted in bearings 205 and is provided with a pair of gears 203 adapted to mesh with the gears 202 disposed on the opposite sides of the two sets of disks. When the shaft 204 is rotated, the disks of one set will be moved toward each other and the disks of the opposite set will be moved away from each other.

In connection with the disk shifting mechanism shown in Fig. 10 there is also illustrated a slightly different connection to the differential gearing. In this figure, gear 106 is driven at constant speed, the spider 108 is connected to the shaft 121 which is driven at variable speed and the gear 105 is connected to the driven shaft 69.

*Operation of structure shown in Fig. 10.*

With the gearing illustrated in Fig. 10 when the spider 108 is driven at half the speed of the gear 106 no drive of the driven shaft will be effected. As the spider is driven at more than half the speed of the gear 106 the driven shaft will be driven in the same direction as the drive shaft and as the spider is slowed down to less than half the speed of the gear 106 the driven shaft will be reversed in its direction of rotation.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claim.

What I claim is:

Transmission mechanism comprising a drive shaft, a driven shaft, planetary gearing comprising a pinion, a spider with a planet gear thereon, and a ring gear, a constant speed driving connection between one of the planetary gearing elements and the drive shaft, a variable speed driving connection between the drive shaft and a second element of the planetary gearing, the third planetary gearing element being connected to the driven shaft, said variable speed driving connection comprising a pair of inwardly facing conical disks driven by the drive shaft at a constant speed, a second shaft connected to the second element of the planetary gearing, a pair of inwardly facing conical disks connected to said second shaft, a belt connecting the disks and means for simultaneously shifting at least one of the disks of each pair in such a manner that the second shaft can be driven at speeds greater than or less than the other shaft, and means for directly connecting the drive shaft to said second planetary gearing element, comprising a clutch element on said second shaft, and a clutch collar splined to the drive shaft, adapted for engagement with said element whereby the second shaft may be driven at direct or motor speed when the speed of rotation of the spider reaches the speed of rotation of the drive shaft.

In witness whereof, I have hereunto set my hand this 28th day of May, 1925.

WILHELM B. BRONANDER.